I. B. NAYLOR.
IRRIGATING CONDUIT.
APPLICATION FILED OCT. 18, 1912.
1,078,635.
Patented Nov. 18, 1913.
3 SHEETS—SHEET 1.
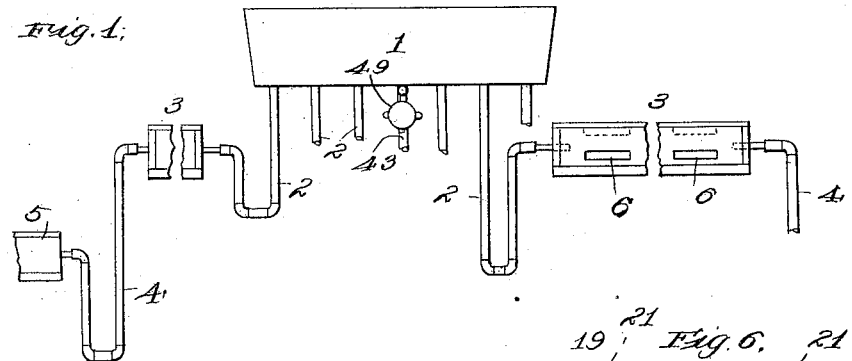
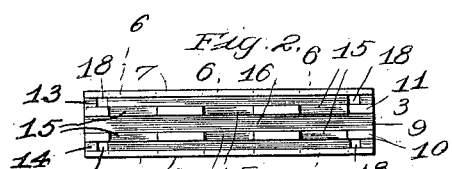
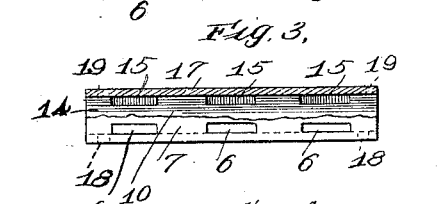
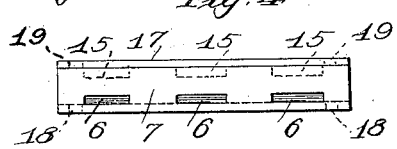
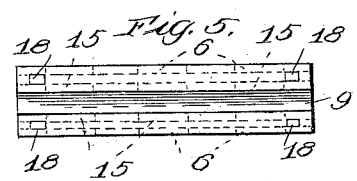
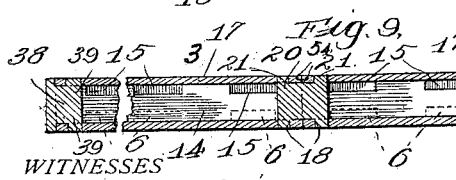
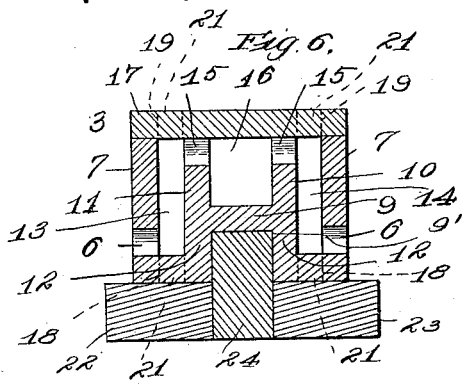
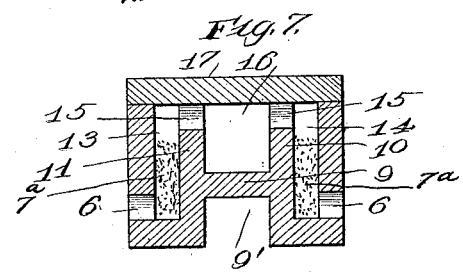
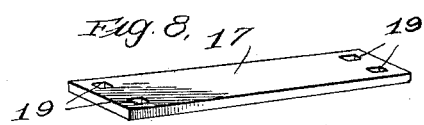
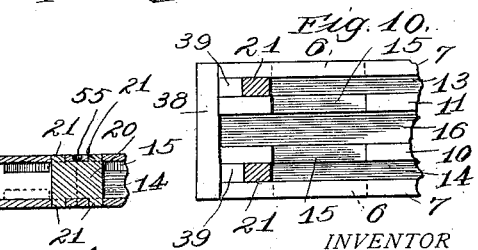
WITNESSES
INVENTOR
Isaac B. Naylor
By Edwin S. Clarkson
Attorney

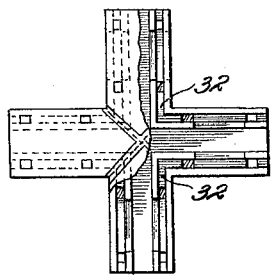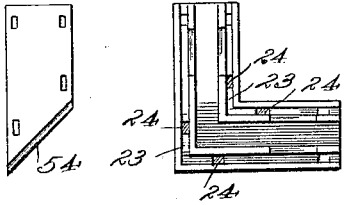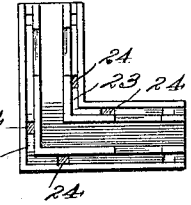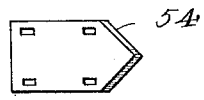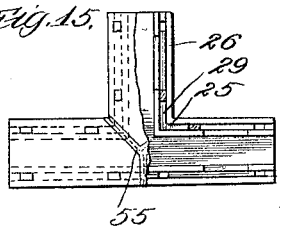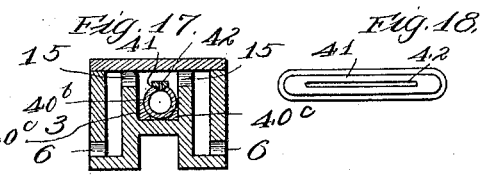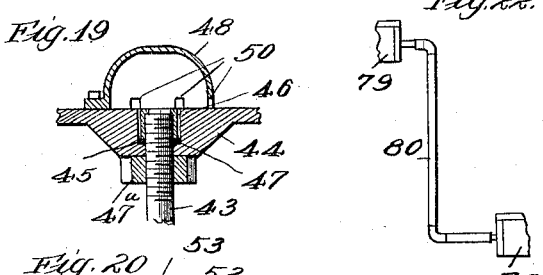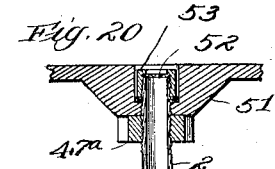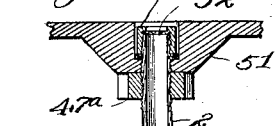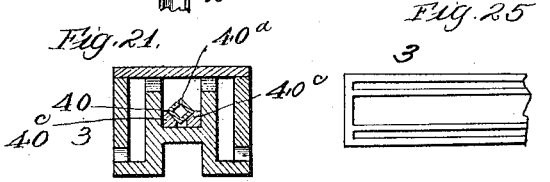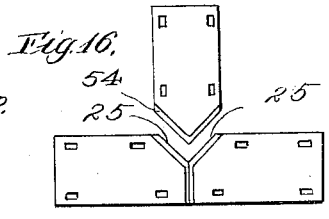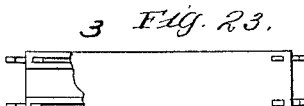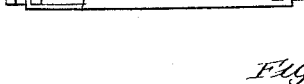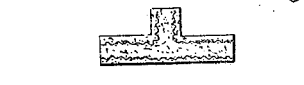

I. B. NAYLOR.
IRRIGATING CONDUIT.
APPLICATION FILED OCT. 18, 1912.
1,078,635.
Patented Nov. 18, 1913.
3 SHEETS—SHEET 3.
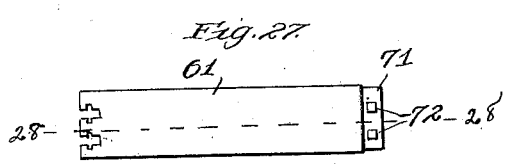
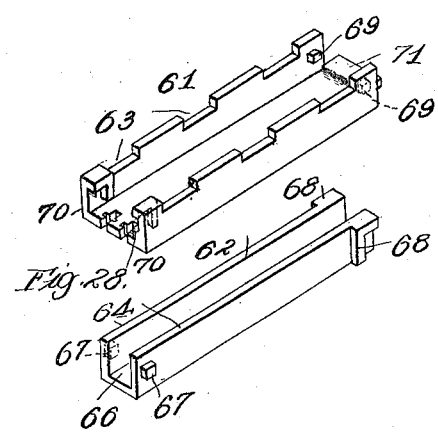
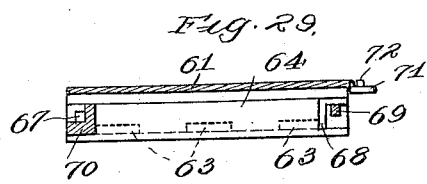
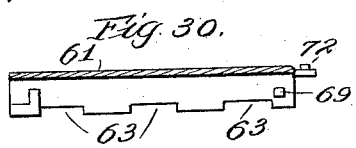
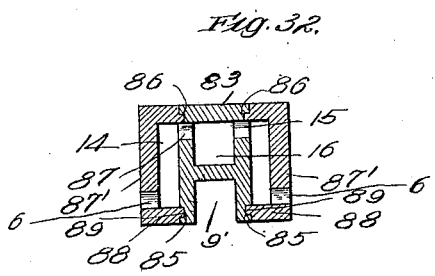
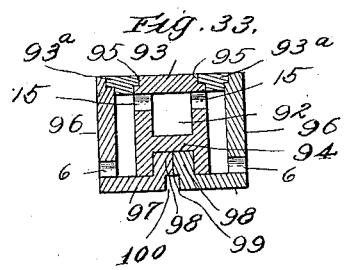
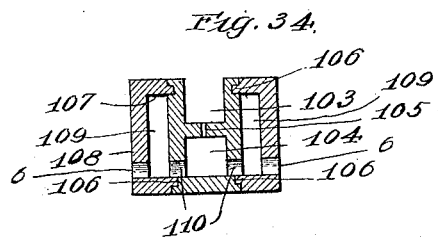
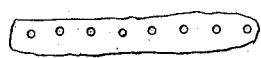
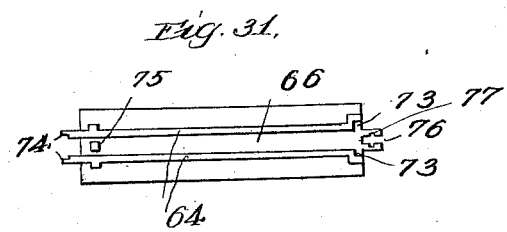
WITNESSES
INVENTOR
Isaac B Naylor
By Edwin S. Clarkson
Attorney
COLUMBIA PLANOGRAPH CO., WASHINGTON, D. C.

UNITED STATES PATENT OFFICE.

ISAAC B. NAYLOR, OF NEW YORK, N. Y.

IRRIGATING-CONDUIT.

1,078,635.  Specification of Letters Patent.  Patented Nov. 18, 1913.

Application filed October 18, 1912. Serial No. 726,554.

*To all whom it may concern:*

Be it known that I, ISAAC B. NAYLOR, a citizen of the United States, residing at New York, in the county of New York and State of New York, have invented certain new and useful Improvements in Irrigating-Conduits, of which the following is a specification.

The object of my invention is to apply water to land so as to promote vegetable life thereon, without loss of water by evaporation or by oversupply. I do this by carrying the water in a pipe system underground, free of contamination and obstruction, so that when the water comes into contact with the soil by overflow from the pipe, it ascends by natural capillary action to the roots of any vegetation growing thereon or to any seeds or bulbs sown or planted therein within its radius.

A still further object of my invention is to regulate the quantity of water supplied to a given field according to the needs and character of the vegetation in said field, and the character of the soil material.

A still further object of my invention is to control the flow of the water into the soil in such manner that all danger of undermining at the point of exit is eliminated.

A still further object of my invention is to construct the conduit so as to prevent the soil washing into the main body of water, whereby I am enabled to have a steady, regular flow of water of equal volume throughout the system besides which the soil of one field is not carried by the main body of water to another field as is experienced in many systems of irrigation.

Another object of my invention is to transmit a large volume of water a long distance with a minimum of loss and at the same time irrigate along the system; and with these and minor objects in view my invention consists of the parts and combination of parts as will be hereinafter more fully set forth.

In the drawings: Figure 1 is an elevation of a supply tank, or reservoir with mains leading therefrom. Fig. 2 is a top plan view of one of the sections of the conduit. Fig. 3 is a side elevation partly broken away. Fig. 4 is a side elevation of a conduit section. Fig. 5 is a bottom plan view of a conduit section. Fig. 6 is a transverse section on an enlarged scale of a conduit section and its anchoring base. Fig. 7 is a similar view showing the channel partly filled with sand. Fig. 8 is a perspective view of the cover. Fig. 9 is a longitudinal sectional view of a conduit parts being broken away. Fig. 10 is a detail top plan view of the end of a conduit section and an end closure. Fig. 11 is a top plan view of a four way branch in a conduit. Fig. 12 is a top plan view of one of the covers for a four way joint. Fig. 13 is a top plan view of a right angle bend in a conduit. Fig. 14 is a top plan view of one of the covers for a right angle bend. Fig. 15 is a top plan view of a conduit section formed with a single lateral branch. Fig. 16 is a top plan view of a cover for the main and lateral branch shown in Fig. 15. Fig. 17 is a transverse section of a conduit section showing a pipe mounted therein. Fig. 18 is a detail view of the exit port for the pipe shown in Fig. 17. Fig. 19 is a detail sectional view of the water inlet for the reservoir or tank shown in Fig. 1. Fig. 20 is a similar view of the water exit for the tank. Fig. 21 is a view similar to Fig. 17 showing a pipe of different cross section. Fig. 22 is a view of a portion of the conduit constructed to raise water from a lower to a higher level. Fig. 23 is a top plan view of a conduit section showing the binder integral therewith. Fig. 24 is a transverse sectional view of an anchoring base formed of reinforced cement. Fig. 25 is a detail sectional view showing an end section of a conduit with an end closure cast integral therewith. Fig. 26 is a detail view of a surface irrigation system. Fig. 27 is a top plan view of another embodiment of my invention. Fig. 28 is a perspective view of the top and bottom member separated. Fig. 29 is a sectional view on the line 28—28 Fig. 27. Fig. 30 is a longitudinal sectional view of the top member. Fig. 31 is a top plan view of the lower member of a modified construction. Figs. 32, 33, 34 and 35 are detail sectional views of further embodiments.

The reference numeral 1 represents a reservoir of any suitable construction, 2 are pipes leading from the bottom thereof, 3 the irrigating pipes or conduit, 4 a substantially U-shaped pipe leading from one of the conduits 3 to a similar conduit, 5 on a lower level; said conduits being provided with elongated openings 6 through their sides at a point near the bottom thereof as will be more fully hereinafter explained. The conduits 3 may be formed of metal, reinforced cement, clay or any other suitable material as found most advantageous.

The conduit is made up of sections and each section provided with two side walls 7 and a bottom wall 9, integrally formed; the bottom being provided with a groove 9′ extending throughout its length and serving as an anchor space to be hereinafter referred to. Projecting upward from the top wall of the groove 9′ are two partitions 10 and 11, which constitute vertical extensions of the side walls 12 of the groove 9′, thereby forming, with the walls 7, channels 13 and 14. The upper edge of the partitions 10 and 11 are notched or cut away as at 15 to form ducts through which water may pass from the water main or pipe 16 by overflow into the channels from whence the water may flow through the elongated exits 6 formed through the side walls 7, at the bottom of the channels. The head of water flowing from the channels through the exits 6 is at all times sufficient to prevent sand, mud, etc., from clogging the exits, and at the same time prevent the sand, etc., rising in the channels and entering the main water pipe whereby the pipe is always kept clean and free from obstruction. The water pipe or main is formed by the top of the groove 9′ and the partitions 10 and 11 the cover 17 constituting the top wall of the pipe and channels.

18 are holes formed through the bottom wall of each channel near each end, and 19 are similar holes formed near the corners of the cover 17.

Abutting conduit sections 3 are tied together by means of the binder 20 which is provided on the top and bottom edges thereof with lugs or pins 21 at each corner. These binders are adapted to be positioned respectively in the channels 13 and 14 while the pins or lugs are adapted to enter the openings 18 and thus lock the sections together. The cover is locked to the sections by means of the pins on the upper edge of the binder entering the holes 19. A suitable cement may be poured around the lugs or pins 21 thus closing the joint around them.

In laying the conduit, I use three bricks, two of the bricks 22—23 being laid flat while the third brick 24 is stood on one end between the bricks 22 and 23 thereby forming an inverted T bed which is laid in cement or other suitable mortar, see Fig. 6. This bed may be formed of reinforced cement as shown in Fig. 24. After the bed is formed, I secure the conduit sections thereto by fitting the tongue or rib 24 of the bed into the groove 9′ in the bottom of the section thereby firmly anchoring the sections against sidewise movement.

As shown in Fig. 13 in making a right angle bend in the conduit, I bevel the ends of the covers and form holes in the bottom of the channels similar to the holes 18 and insert a right angle binder 23 in the channels which is provided with lugs or pins 24 constructed to enter said holes thereby firmly locking the covers together.

As shown in Fig. 15, I may have a branch conduit at right angles to the main conduit in which construction I form a V shaped recess 25 in one side of the cover for the main conduit intercepting the main pipe and one of the channels, while cover for the end section of the branch conduit 26 is pointed to fit the V shaped recess of the main cover. In this construction, I employ a binder 29 which is similar to the binder 23.

When it is desired to have two laterals from the main conduit, I arrange them as shown in Fig. 11. In this four-way construction, I use a binder 32 in the channels like the binder 23 shown in Fig. 13.

The end section of the conduit may be formed with an integral wall, as shown in Fig. 25, but in order to dispense with the necessity of carrying end sections in stock, I provide a closure 38 constituting an end wall for the section which is provided with integral arms 39, which project into the channels 13 and 14, and are provided with depending lugs similar to 21 on the binder 20, which project into holes 18 in the bottom of the channels. Of course, the joint around the end wall and the depending lugs is cemented in a suitable manner.

When it is desired to carry water a long distance, I may prefer to place a square pipe 40 as shown in Fig. 21 in the sections and provide it with a slot 40$^a$ in its top, equal in length to or longer or shorter than one of the notches 15 and positioned to register with or break joint, with said notches. When I use metal pipe, I insert, preferably, a brass member 41 (see Fig. 18) in said slot provided with a very narrow opening 42 through it, the size of the opening to be varied according to the amount of water one wishes to overflow from the main pipe into the channels 13 and 14 for purposes of irrigation. The member 41 may be made of glass or any other suitable composition not apt to corrode. When this form of pipe 40 is used, or the round pipe 40$^b$ Fig. 17, the full head of water may be used by direct connection with a city main, an Artesian well, or tapped to any full head of natural or artificial supply, as the small perforations 42 serve to prevent a surplus of water overflowing from the pipe into the channels. The object of this construction is that a small amount of water may pass through the openings 42, thence through notches 15 into the channels and thence through the openings 6 into the ground, while the main body of water is confined in the pipe, 40—40ᵇ, and conveyed to a distant point with a minimum reduction in volume and speed, as it has less chance of overflowing into the notches 15 than it would have if the cap 41 were not on.

The reservoir 1 is provided with an inlet water pipe 43 extending upwardly therein through the bottom, as shown in detail in Fig. 19, in which 44 is a boss, formed on the bottom of the reservoir, on which is provided a seat 45 constructed to receive the end of the screw cap 46 between which is interposed a gasket 47 to make a tight joint between the end of the pipe and said seat; the casing is screwed in the boss as shown. The pipe 43 is screw-threaded in the boss 44 and a follower nut 47ᵃ is threaded on the pipe as shown to make a water tight joint. The pipe 43 extends into the cap 46. 49 is a suitable valve in the pipe 43 to control the supply of water. A casing 48 is positioned on the bottom of the reservoir over the pipe 43 and is provided with openings 50 through which the water enters the reservoir without splashing.

The exit pipes 2, see Fig. 20, are screw-threaded in bosses 51 on the bottom of the reservoir, the upper end of said pipes being slightly below the bottom of the reservoir over which is secured a wire mesh 52 by means of a cap 53 screwed on the end of the pipe.

In Fig. 1, I have illustrated means for conveying water from a higher to a lower level in an irrigation system. In this figure, the section 3 is on a higher plane than the section 5, and I connect the sections 3 and 5 by a substantially U-shaped pipe 4, one leg of which is shorter than the other, the shorter leg being connected to the section 5 in the lower plane. It is my intention to position one of these U-shaped members 4 between the reservoir and the first section of the irrigation conduit.

As shown in Fig. 7, I may fill the channels 13 and 14 with sand 7ᵃ to prevent back flow of unfiltered water through the channels into the main pipe. The earth packed around the conduit prevents the sand from being washed out of the channels.

It will be seen that by my system, it is impossible for the water in the main pipe to become contaminated.

As will be seen in the several views the ends of the covers are rabbeted as at 54, so that when the ends abut, a recess is formed into which cement 55 may be placed to close the joint between the sections and at the same time act as a binder between the sections.

In Fig. 26 I show another embodiment of my invention designed as a surface irrigation conduit, in which 56 is the base in which is embedded the ends of a support 57, which may be formed of wire, which is bent intermediate its ends to form a rest 58 for the conduit 59.

In Figs. 27 to 30, I have illustrated another embodiment of my invention in which 61 is the top member and 62 the lower member. The side walls of the upper member are notched as at 63 along their lower edges to form water exits similar to the exits 6. 64 are the side walls of a water conduit 66, the height of said walls being less than the height of the side walls of the upper member so that water may overflow from the main conduit into the channels formed between the walls 64 and the walls of the upper member, thence through the exits 63 into the ground. The walls 64 are provided with a lug 67 at one end, and with a locking member 68 at the other end adapted to interlock with similar locking members on adjacent sections. The upper member is provided with a lug 69 constructed to interlock with the locking member 68 of the lower member, while the locking member 70 slides under the lug 67 whereby the two sections are interlocked. 71 is a projection from one end of the upper member adapted to interlock with an adjacent member and provided with two lugs 72 to receive a binder.

In the modification shown in Fig. 31 the pipe 66ᵇ is provided at one end with a recess 73 formed by a deflection of the walls 64ᵃ and adapted to receive a tongue 74 extending from the abutting end of an adjacent section. In the bottom of the pipe 66ᵇ is a lug 75 adapted to be engaged by a yoke 76 on the end of an adjacent section whereby the sections are locked together at the bottom, the notches 77 permitting cement to be flowed around the lug 75.

The binder 20 may be cast integral with the conduit sections if desired as shown in Fig. 23.

In Figs. 17 and 21, 40ᶜ are filling or supporting blocks for the pipes 40ᵇ and 40.

In Fig. 22 I have shown that part of my system adapted to carry water from the conduit section 78 to the conduit section 79 on a higher level. I do this by connecting the main pipe of the section 79 to the main pipe of section 78 by means of a pipe 80 which is of considerably less diameter than the diameter of the main pipes in the sections.

In Fig. 32 I have shown another embodiment of my invention in which the central portion of the conduit having the anchoring groove 9 and including the main water pipe 16, and the cover 83 are formed in one piece, the outer side walls of the central portion, near their lower edges being each provided with a longitudinal groove 85, while the cover portion 83 is provided with a longitudinal undercut groove 86. The walls of the pipe 16 are provided with the overflow outlets 15, which may be either an elongated slot or may be composed of a series of perforations.

87' are the side members of the conduit which are provided with projecting portions 88 terminating in tongues 89 which are adapted to enter the grooves 85 and 86 of the central member whereby the members are firmly secured together and when secured together the water seal 14 is formed. The members 87' are provided with the exit ports 6.

In Fig. 33, I show still another embodiment of my invention in which the central water pipe 16 is cast with a cover 93 and a longitudinal bottom groove 94. The cover 93 is provided with longitudinal seats 95 on each side thereof extending longitudinally. The side members 96 are provided with inwardly extending bottom flanges 97 having on their inner edges a rib 98 with an overhang 99 whereby the sections 96 are locked to the main pipe 92 by said ribs being introduced into the longitudinal groove 94 as shown in said figure. The overhang of the ribs forms a space 100 into which the cement of a base may be squeezed thereby forming an anchor to hold the conduit sections against transverse displacement. Of course this form of conduit is provided with the overflow openings 15 and the exit openings 6. 93ª are covers for the water seal.

Referring to Fig. 34 I have shown what I shall term a surface irrigating conduit in which the main water pipe 103 is cast or formed with a chamber 104 beneath it there being communication between the two by means of a duct or passage 105. The side walls of the central portion just described are provided with longitudinal grooves 106 constructed to receive the inwardly extending flanges 107 of the side members 108, as shown in the drawing. 109 is the water seal. The chamber 104 is provided with ducts 110 leading into the water seal at its bottom while the water seals are provided with exits 6. By this construction I may be enabled to conduct a large body of water overland through the main pipe 103 and at the same time, without materially diminishing the speed or the columns of water, permit some of the water to drip through the perforations 105 into the chamber 104 from which it is free to flow through the exits 110 and 6 into the ground for irrigating purposes. The pipe 103 is shown without a cover but of course it is obvious that I may cover it as in the other constructions.

In lieu of the slots 15 and 16 as shown in Figs. 32 and 33 overflow and exit ports in the form of perforations as illustrated in Fig. 35 may be used.

I do not herein claim the method or system as that will form the subject matter of a divisional application.

What I claim and desire to secure by Letters Patent is:

1. An irrigating conduit comprising a section having side walls and an upwardly extending bottom portion spaced from and cooperating with said walls to form lateral channels, said bottom portion further having upwardly extending walls to provide a main water pipe, ports establishing communication between said main water pipe and the respective lateral channels and exit ports at the bottom of said lateral channels.

2. An irrigation conduit made up of a series of sections, parallel partitions in each section extending lengthwise thereof and dividing the sections into a main water pipe and water seal channels on the respective sides of said pipe, ports between the channels and water pipe, openings in the bottom of each channel near the respective ends of each section, binders fitted in the respective channels and extending across the joint between adjacent sections, and having lugs extending from the lower face thereof constructed to enter the openings in the bottom of the channels, said binders also having lugs extending from their upper face, and a cover for said sections having openings into which the lugs on the upper face of the binders project.

3. An irrigation conduit comprising side walls and a base, a longitudinally extending groove in the outer face of the base, the lateral walls of the groove being continued upward to the plane of the top of the side walls thereby forming a central pipe and channels on the respective sides of said pipe extending in the direction of the length of the conduit, ports between said channels and pipe, and ports leading from said channels through the said side walls.

4. An irrigation conduit made up of a series of sections, each section having side walls and a base, a longitudinally extending groove in the outer face of the base, the lateral walls of the groove being continued upward to the plane of the top of the side walls thereby forming a central pipe and channels on the respective sides of said pipe extending in the direction of the length of the conduit, ports between said channels and pipe, ports leading from said channels through the said side walls, and means locking said sections at their adjacent ends.

5. An irrigation conduit made up of a series of sections, each section comprising side walls and a base, a longitudinally extending groove in the outer face of the base, the lateral walls of the groove being continued upward to the plane of the top of the side walls thereby forming a central pipe and channels on the respective sides of said pipe extending in the direction of the length of the conduit, ports between said channels and pipe and ports leading from said channels through the said side walls, means locking said sections at their adjacent ends, and an inverted T anchoring base, the stem of which is positioned in said groove.

6. An irrigation conduit made up of a series of sections, parallel partitions in each section extending lengthwise thereof and dividing the sections into a main water pipe and water seal channels on the respective sides of said pipe, ports between the channels and water pipe, openings in the bottom of each channel near the respective ends of each section, binders fitted in the respective channels and extending across the joint between adjacent sections, and provided with lugs extending from the lower face thereof constructed to enter said openings, thereby locking the sections together, said binders also having lugs extending from their upper face, a cover for said sections having openings into which the lugs on the upper face of the binders project, a cap for the end section of the conduit, arms extending inwardly from said cap into said section and lugs on the ends of said arms constructed to enter said openings in the bottom of said channels, thereby locking said cap on the end of the section and sealing said end.

7. An irrigation conduit made up of a series of sections each having a longitudinally extending groove in the under face thereof, in combination with an inverted T shaped anchoring bed comprising two blocks laid flat and a third block stood on end between said two blocks to form a tongue extending into said groove.

In testimony whereof I affix my signature in presence of two witnesses.

ISAAC B. NAYLOR.

Witnesses:
EDWIN S. CLARKSON,
IDA T. STANLEY.

---

Copies of this patent may be obtained for five cents each, by addressing the "Commissioner of Patents, Washington, D. C."